United States Patent [19]

Waldron et al.

[11] Patent Number: 4,746,985
[45] Date of Patent: May 24, 1988

[54] GENERATING PICTURE EFFECTS IN VIDEO SIGNALS

[75] Inventors: Christopher J. Waldron, Harston; Michael J. Meadows, Bishop's Stortford; Jeremy A. Rodgers, Welwyn Garden City; Ronald W. J. Mumford, Hitchin, all of England

[73] Assignee: Rank Cintel Limited, United Kingdom

[21] Appl. No.: 940,562

[22] Filed: Dec. 11, 1986

Related U.S. Application Data

[63] Continuation-in-part of Ser. No. 722,153, Apr. 11, 1985, Pat. No. 4,694,345.

[51] Int. Cl.⁴ .................... H04N 3/36; H04N 5/208
[52] U.S. Cl. .................... 358/216; 358/162; 358/218
[58] Field of Search ............ 358/162, 214–216, 358/209, 218

[56] References Cited

U.S. PATENT DOCUMENTS

| | | | |
|---|---|---|---|
| 3,800,077 | 3/1974 | Smith | 358/162 |
| 3,979,556 | 9/1976 | Vidal | 358/216 |
| 4,272,780 | 6/1981 | Belmares-Sarabia et al. | 358/162 |
| 4,312,017 | 1/1982 | Poetsch | 358/214 |

FOREIGN PATENT DOCUMENTS

| | | | |
|---|---|---|---|
| 58-85673A | 5/1983 | Japan | 358/169 |
| 1164910A | 6/1985 | U.S.S.R. | 358/218 |

Primary Examiner—Jin F. Ng
Assistant Examiner—Stephen Brinich
Attorney, Agent, or Firm—Ostrolenk, Faber, Gerb & Soffen

[57] ABSTRACT

Several effects are described which are programmable in telecines. Variable aperture correction is described which allows appropriate correction to be applied to different types of film stock. Soft focus and distortion effects are also described. The effects can be selected for whole scenes or for frames or frame portions, to give a range of effects which can be used to improve picture quality or for artistic effect.

57 Claims, 11 Drawing Sheets

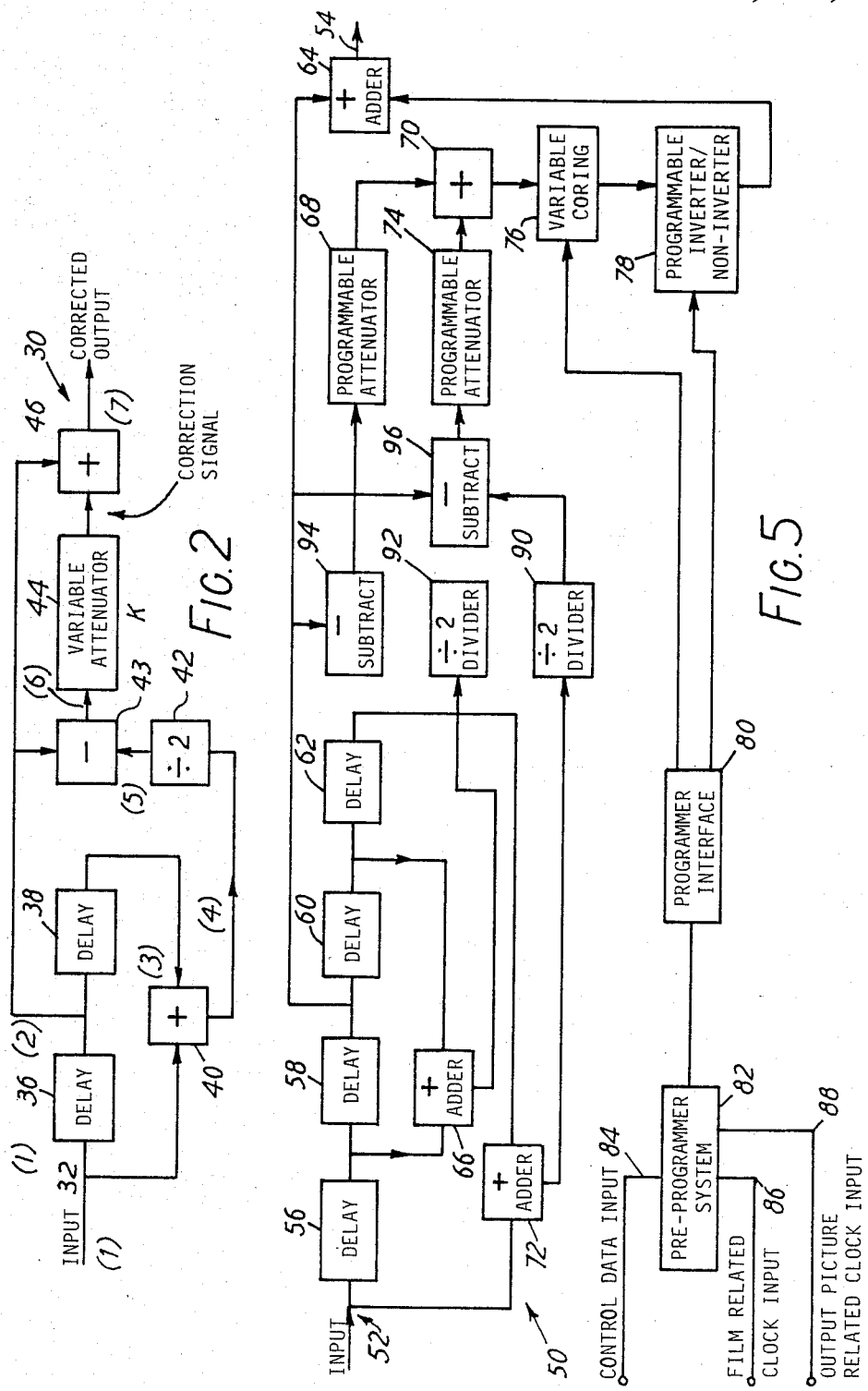

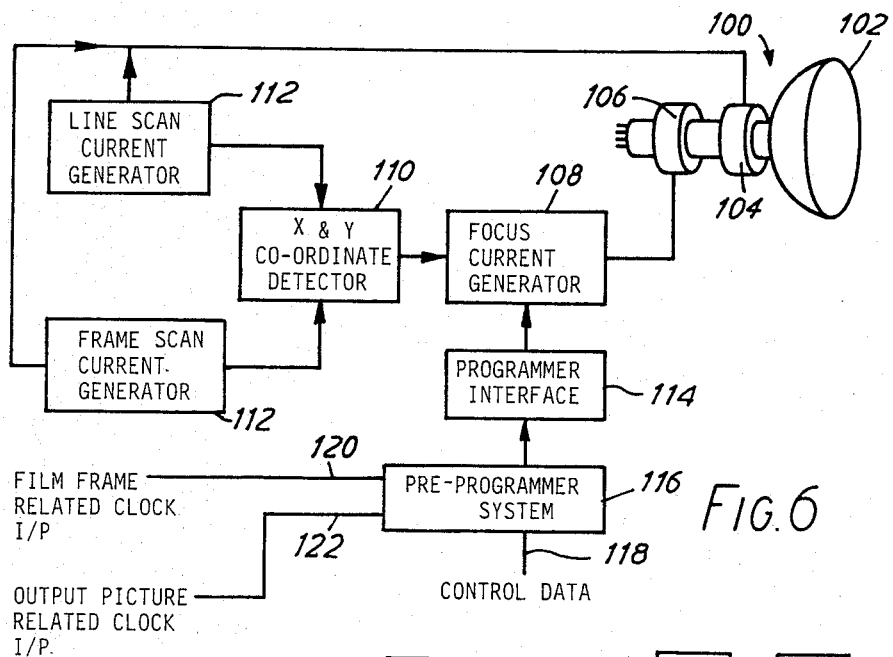
FIG.6
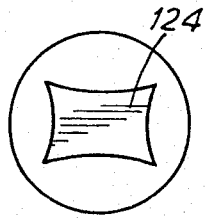
FIG.7a
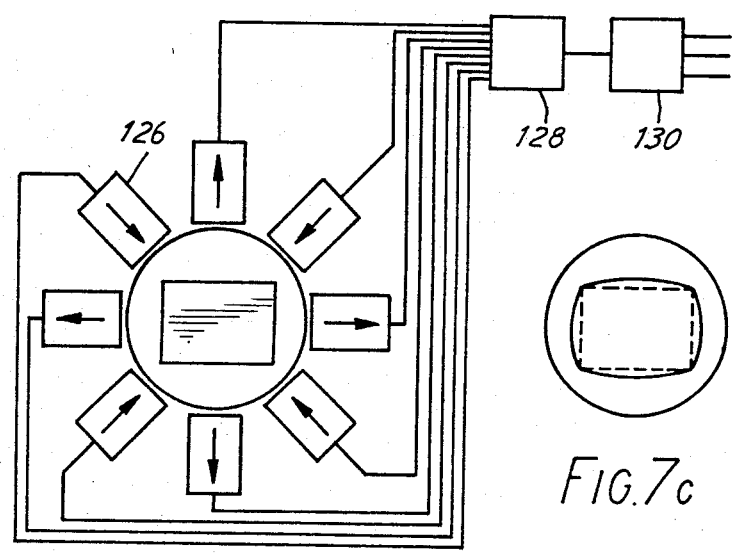
FIG.7b
FIG.7c
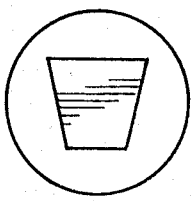
FIG 8
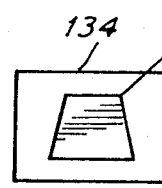
FIG.9

GENERATING PICTURE EFFECTS IN VIDEO SIGNALS

The present invention relates to the generation of picture effects in video signals, especially in video signals from telecine apparatus. The effects may be programmes in telecine apparatus by using a pre-programming system of the type described in U.S. patent application, Ser. No. 722,153, filed on 11th Apr. 1985 now U.S. Pat. No. 4,694,345 of which this application in a continuation-in-part. The invention also relates to apparatus for generating the effects.

BACKGROUND OF THE INVENTION

There is a constant search in the field of television for new effects which can be used to aesthetically enhance television pictures, either by improving their actual or perceived quality or by modifying the pictures for artistic reasons.

One method of improving picture quality is to apply a technique known as aperture correction to the video signals. Video signals are generated by scanning an image to take samples which have a finite size determined by the dimensions of the apparatus used. Aperture correction techniques seek to correct for the finite size of the samples, to create the video signal which would have resulted from a smaller, preferably infinitesimally small sample size. Aperture correction is used, for instance, in telecine apparatus.

A telecine is a known piece of equipment which is designed to product TELEvision signals from CINEmatographic film, and is commonly used by television stations and the like to provide television signals from feature films or from news material recorded on film.

There are basically three known types of telecine, namely flying spot, camera tube, and solid state array (usually linear array) telecines. In a flying spot telecine, the film runs between a cathode ray tube operating as a light source and a simple light-sensitive detector. The cathode ray tube is arranged to display a single spot of light which follows a raster such as to scan the film with the desired scan pattern, and the detector output thus forms the basis of a television signal. The less-common camera tube type is in a sense the converse of this, as the whole film frame is illuminated by a source, opposed to which is a camera tube which operates with an appropriate scanning raster but otherwise like any other television camera to provide a scanned output. So far as solid state array types are concerned, only linear array types are on the market and in these the film runs between a light source and a linear semiconductor light sensor arranged across the film path on the other side of the film. Typically the sensor will have 1024 individual elements or cells. Thus one line is sensed at a time, and the array is amptied as though it were a shift register to provide a signal representing one line. Two-dimensional arrays can be foreseen in which more than one line might be available simultaneously.

The size of the image samples used to generate the video signals are determined by the size of the scanning spot or the size of the sensor cells. Aperture correction is used to correct for these finite sizes. A correction signal is derived by sampling the video signal before and after a portion representing a detail to be enhanced, and the correction signal is then added to the original video signal at that portion. Correction is normally applied in both the horizontal and vertical directions, that is by sampling the picture to either side of the detail (horizontal correction) and above and below the detail (vertical correction).

It was an object of the invention to enable video signals from a telecine to be processed to create effects other than aperture correction, and to provide these effects in ways which permit of pre-programming by a system such as that described below and in the U.S. patent application referred to above.

SUMMARY OF THE INVENTION

In one aspect of the invention, aperture correction is provided by forming two treatment signals. Each treatment signal is formed from a respective pair of samples of the untreated video signal. Each paid comprises samples taken at a sample point ahead of the detail to be treated and at a sample point behind the detail. These treatment signals represent a high and a low frequency correction signal and are combined with the original video signal invariable proportions set according to the degree of correction required. The proportions are set for each scene of a film, for each frame or for each portion of a frame and recorded in a pre-programming system. Furthermore, the proportions can be chosen to generate special effects such as soft focus.

In another aspect of the invention, the shape of the scanning raster is controlled so that a non-rectangular portion of the film image is scanned. This results in the final television image being distorted, and this distortion can be controlled and used as a special effect. The invention provides means by which the distortion can be pre-programmed.

In a third aspect of my invention, applicable to flying spot telecines, the spot size is controlled and can be enlarged to give soft focus effects which can be pre-programmed.

BRIEF DESCRIPTION OF THE DRAWINGS

Embodiments of the invention will now be described in more detail with reference to the accompanying drawings, in which:

FIG. 2 is a schematic diagram of a simple known aperture correction circuit.

FIG. 5 is a schematic diagram of an aperture correction circuit for use in the apparatus of the invention;

FIG. 6 is a schematic diagram of part of a telecine having means for generating soft focus effects;

FIG. 7(a) shows a CRT screen image with pincushion distortion;

FIGS. 7(b) and 7(c) show means for correcting pincushion distortion, and an over-corrected raster;

FIG. 8 shows a non-rectangular raster on a CRT screen;

FIG. 9 shows a T.V. image produced by scanning a film with the raster of FIG. 8;

FIG. 1 is a block schematic diagram of a flying spot telecine. A film 10 is illuminated by a spot on the screen of a cathode ray tube 12 (CRT). Drive circuitry 14 causes the spot to scan a raster on the screen, thereby scanning the image on the film. After passing through the film, the light from the spot is detected by photomultipliers 16. A telecine for colour film will consist of three photo-multipliers for detecting, respectively, the red, blue and green components of the image.

Figure 1:
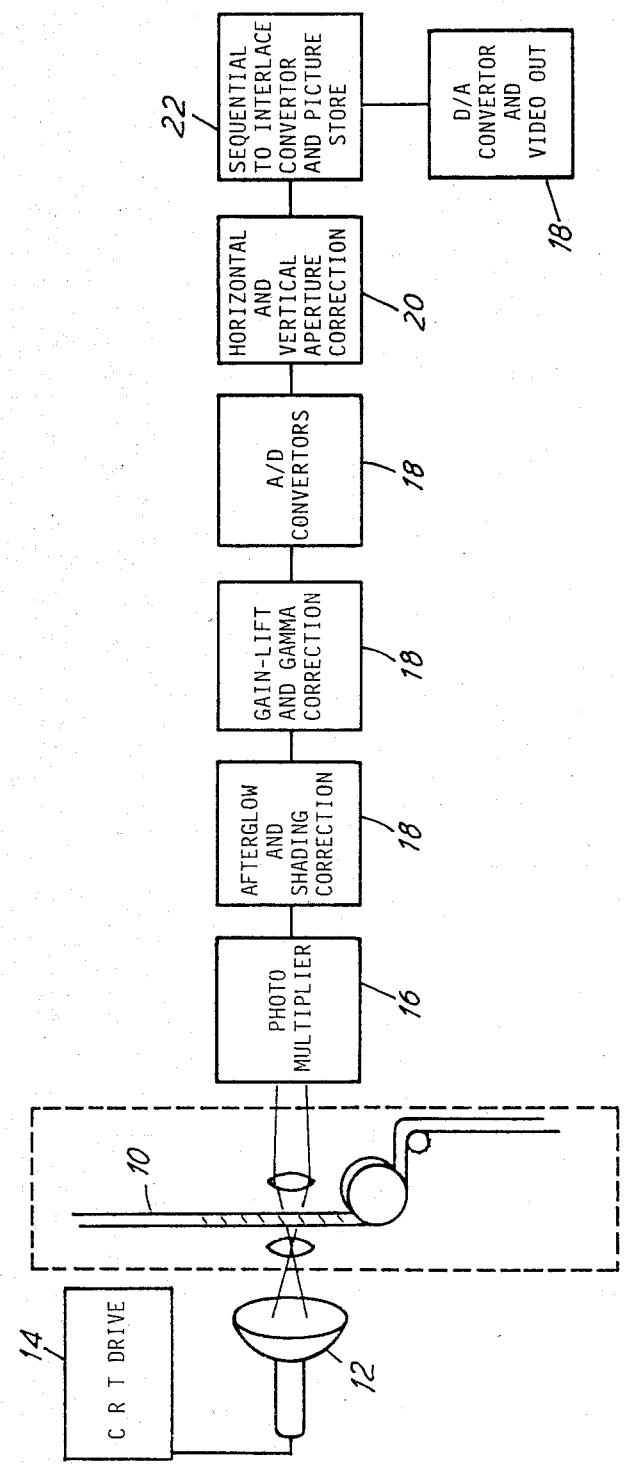
FIG. 1 is a schematic diagram of a telecine incorporating aperture correction circuitry.

The film image is scanned horizontally by the spot, that is across the width of the film, and a line at a time. Therefore, the elctrical output from the photomultipliers represents a raw line-sequential video signal. The raw video signal is processed by several circuits 18, 20, 22 to put it into a standard format. These circuits include a horizontal and vertical aperture correction circuit 20 and a picture store 22 which converts the signal to an interlaced signal.

FIG. 2 shows a known aperture correction circuit 30. The circuit 30 has a signal input 32 for receiving a video signal which is provided at a signal output 34 after aperture correction. The input signal is passed through two delays circuits 36, 38 connected in series, before being applied to one input of a two-input adder circuit 40. The other input of the adder circuit 40 is supplied with the input signal without delay.

The output of the adder circuit 40 passes through an attenuator 42 which divides the signal by a factor of two. The output signal (5) from the attenuator 42 is then passed to a subtracting circuit 43 where it is subtracted from the signal (2) which appears at the output of the delay circuit 36. The output (6) from the subtracting circuit 43 forms the correction signal. The amplitude or amount of the correction applied K is controlled by a variable attenuator 44 which receives the correction signal 6 from the subtracting circuit 43. The output signal from the attenuator 44 is passed to a second adder 46 where it is combined with the output from the first delay circuit 36 to give a corrected signal (7).

The effect of the delay circuits 36, 38 is that the correction signal is formed from samples of the uncorrected input signal taken at points ahead of and behind the reference point to be corrected, which is the output of the delay circuit 36.

Figures 3A, 3B:
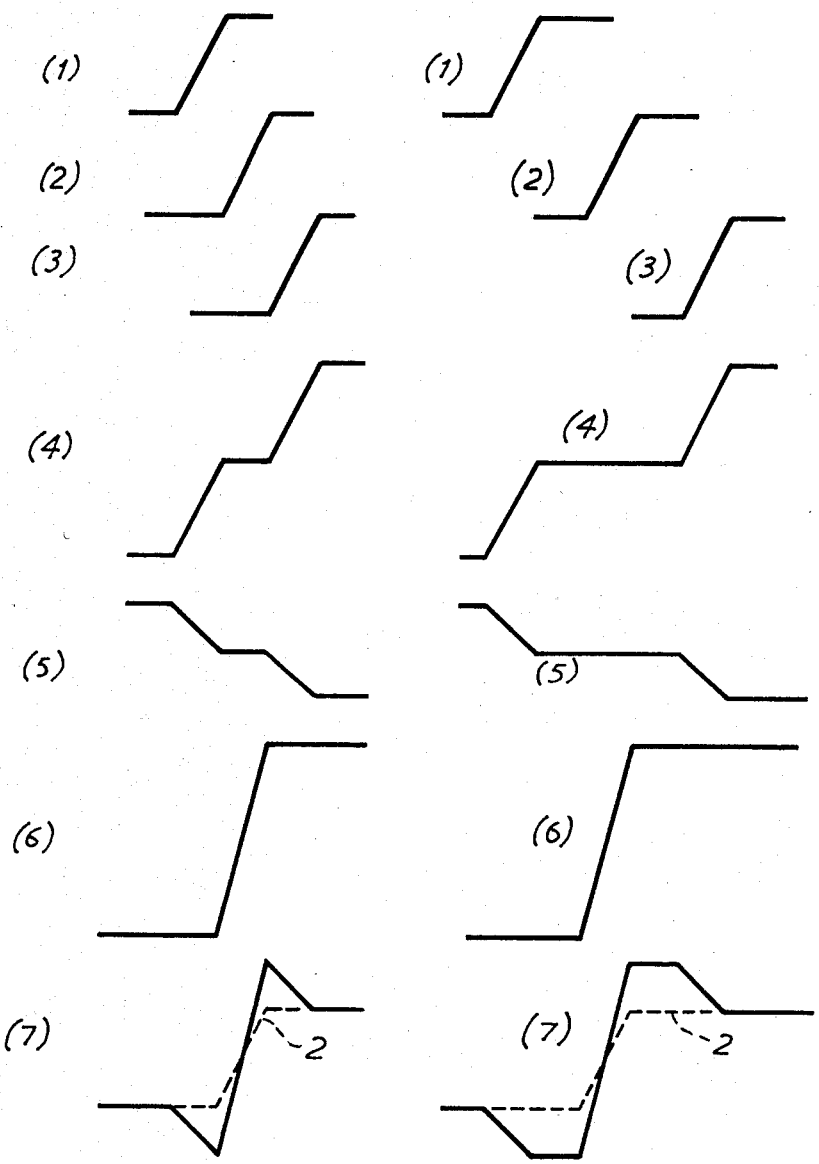
FIGS. 3(a), 3(b), 4(a), and 4(b) show signals at various points in the circuit of FIG. 2, for different inputs and for different lengths of delay provided by the circuit.
Figures 4A, 4B:
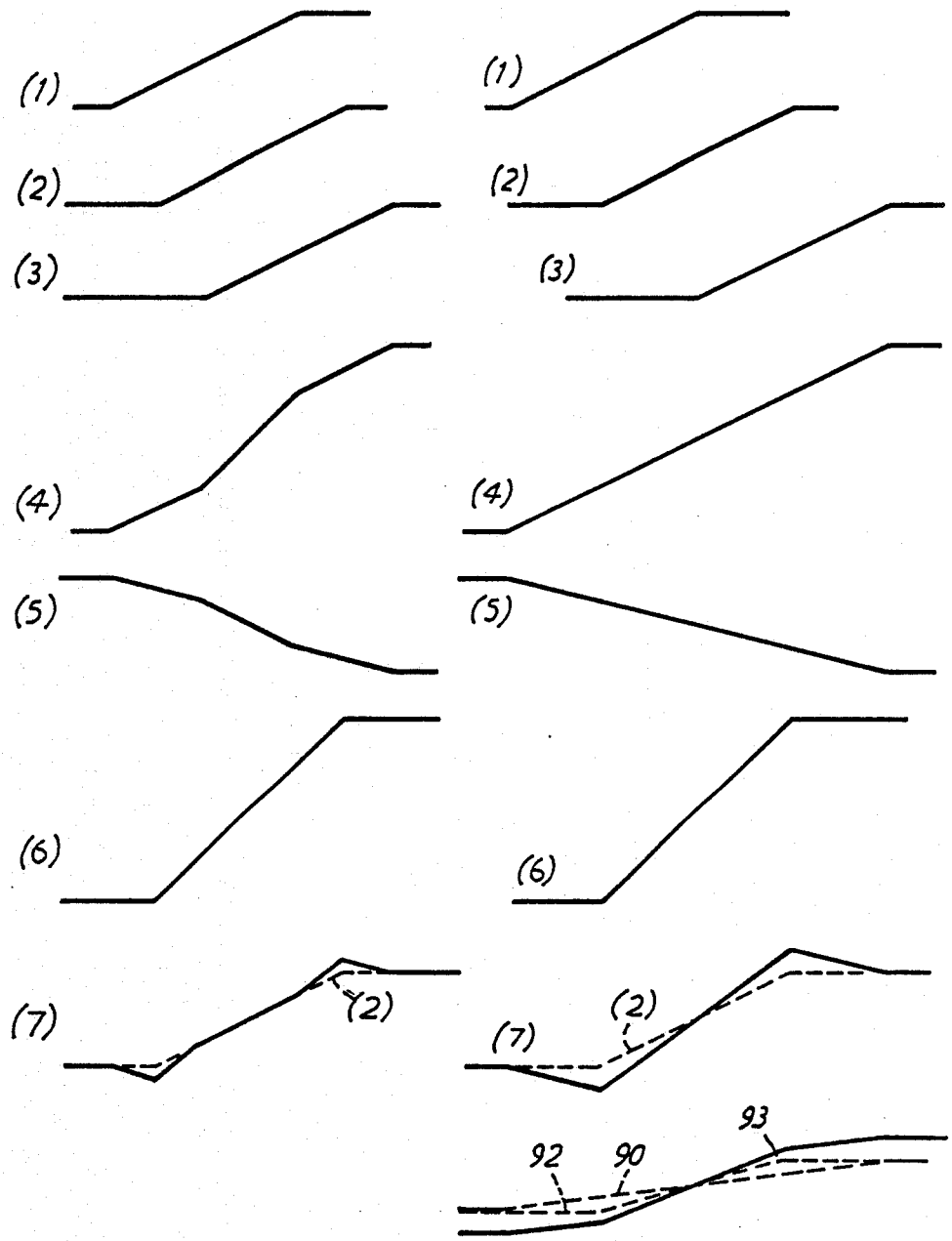

FIGS. 3(a) and 4(a) show the output signal at 34 resulting from two possible input signals, and various signals which appear at intermediate points in the circuit 30. FIGS. 3(a) and 4(a) are drawn on the assumption that the delays provided by the circuits 36, 38 are equal and relatively short. FIGS. 3(b) and 4(b) show equivalent waveform when the delay circuits provide relatively long delays. In each of these Figures, all of the waveforms are drawn to a common horizontal timebase. Corresponding waveforms in FIG. 3(a) and 3(b) and corresponding waveforms in FIGS. 4(a) and 4(b) are drawn to the same vertical axis of amplitude. A bracketed numeral appears beside each waveform in FIGS. 3(a), 3(b), 4(a) and 4(b) and a corresponding bracketed numeral on FIG. 2 indicates the point of the circuit 30 at which the waveform appears, with the exception of waveform (8) (FIG. 4(b)).

The video input signal (1) is delayed by the circuit 36 to give the waveform (2) and delayed again by the circuit 38 to give the waveform (3). The output (4) of the adder circuit 40 is the sum of the waveform (1) and (3), which after attenuation and substration from (2) becomes the waveform (6). This is added to the waveform (2) to produce the output waveform (7).

In FIGS. 3(a) and 3(b), the input (1) has a short rise time. This corresponds to high frequency information in the signal, such as that resulting from a detail shown on the film at high resolution. This might be a detail on a 35 mm film.

A comparison of the waveforms (7) shows that the output in FIG. 3(a) has a steeper rise than the input (1), corresponding to a subjective increase in resolution, without an unacceptable degree of distortion at the beginning and end of the rise. Distortion at the beginning is known as pre-shoot and distortion at the end is known as over-shoot.

The output in FIG. 3(b) also has a steeper rise, but has an unacceptable degree of pre-shoot and over-shoot. These would be perceptible as degradation in a television image. Thus, the circuit 30 will be better at performing aperture correction on a signal from 35 mm film when the delay circuits provide short delays. This corresponds to sampling the input close to the point to which a correction is applied, and is known as high frequency correction.

FIGS. 4(a) and 4(b) show the result of a low resolution signal, with a slow rise time, being applied to the circuit 30. This input might originate from 16 mm film for instance. In this case, high frequency correction produces the waveform (7) of FIG. 4(a) which represents an insignificant increase in resolution over the input, because the signal is unchanged over a large part of its rising portion. Low frequency correction arising from long delays gives the output of FIG. 4(b) which has improved resolution (a steeper rise).

Accordingly, the circuit of FIG. 2, using fixed length delays, would not be fully suitable for use in a telecine designed for use with both 16 mm and 35 mm film.

FIG. 5 shows an embodimentof a circuit 50 which can provide high or low frequency correction as required or a mixture of high and low frequency correction.

The circuit 50 has an input 52 and an output 54. A video signal arriving at the input 52 is applied to a chain of four delay circuits 56, 58, 60, 62 connected in series. The output of the second delay circuit 58 provides the signal to be corrected, which is applied to one input of a two input adder circuit 64.

A second two input adder circuit 66 combines the outputs of the delay circuits 56 and 60 to form a first treatment signal which is halved in amplitude by a divider circuit 92 and then subtracted from the output signal of the delay circuit 58 by a subtracting circuit 94. The output of the subtracting circuit 58 is then passed to a variable attenuator 68 and applied to one input of a third two-input adder circuit 70.

The second input of the adder circuit is a second treatment signal formed by an adder circuit 72 from the original input at 52 and the output of the fourth delay circuit 62, and attenuated by a second divide-by-two circuit 90. The second correction signal is formed by a subtracting circuit 96 and programmable attenuator 74.

The combined treatment signals pass from the adder circuit 70 through a coring circuit 76 and an inventor 78 to the second input of the adder circuit 64, where they are combined with the signal to be corrected.

Coring is a known technique which prevents noise which forms part of the treatment signals from being combined with the signal to be corrected. The coring circuit ignores a low amplitude band of its input signal. Signals within the band (which are most likely to contain noise) are not passed. Signals outside the band are passed with an amplitude reduced by the width of the band, thereby extracting a "core" from the input signal. The "degree" of coring is a measure of the width of the band.

The use of four delay circuits and the arrangement of the connections to the circuits 66, 72 means that the circuit 66 provides a treatment signal which is a high frequency correction signal, whereas the circuit 72 provides a signal which is a low frequency correction signal. The variable attenuators 68, 74 allow the high and low frequency signals to be mixed in selectable proportions before being applied to the signal to be corrected.

FIG. 5 also shows, schematically, apparatus which enables the aperture correction applied by the circuit 50 to be programmed in advance.

A programmer interface 80 receives instructions from a pre-programming system 82. The interface 80 converts its inputs into instructions which aresent to control the attenuation provided by the attenuators 68,74, the degree of coring provided by the circuit 76 and the operation of the invertor 78.

The required settings of the circuits 68, 74, 76 and 78 are determined in advance by a technician operating controls (not shown) which provide control data to an input 84 of the system 82. The system 82 records the control data in association with data provided at two further inputs 86, 88, identifying the film frame being scanned and the position in the frame of the portion being scanned.

The input 88 can be derived from scanning control waveforms in flying spot or camera type telecines or from memory addresses in a solid state array telecine.

Once the technician has selected all of the required settings for a length of film and has stored them in the pre-programming system, the film can be run through the telecine at speed, while the system 82 automatically provides control signals to the interface 80 in response to synchronising signals received on the inputs 86, 88 and identifying the frame and frame portion being scanned. The interface 80 instructs the circuits under its control to provide the pre-programmed settings.

The use of a synchronising signal which identifies the frame portion being scanned enables the circuit 50 to process different portions of a single frame in different ways. This facility can be used for providing special effects, for instance by enhancing detail only in selected portions. Moreover, the ability to control the operation of the invertor 78 enables the circuit 50 to be used to reduce the perceived sharpness of detail, to produce an effect known as "soft focus", over the whole or a portion of an image.

The bottom group of waveforms in FIG. 4(b) indicates the principle of providing soft focus. This group are drawn to a reduced amplitude as compared with the remainder of the waveforms of FIG. 4(b). The correction signal 90 applied to the uncorrected signal 92 is the waveform (5) after phase reversal. This is the correction signal which the circuit of FIG. 2 would apply if the inverter 42 was not present. The resultant output 93 has a substantially longer rise time than the input signal. This increase is perceived as a softening of focus.

The ability of the interface 80 to control the invertor 78 to invert or not to invert the signal to the circuit 64, and the ability to control the proportions of high and low frequency correction applied, enables a range of soft focus effects to be produced by the circuit 50 over all or a portion of an image.

The circuit 50 can be used advantageously with a flying spot telecine which is simulating zoom in a manner described in the U.S. patent application described above. In that technique, zoom is simulated by scanning a progressively larger or smaller portion of a film image. As the telecine "zooms in" to enlarge the image, the size of the spot increases as a proportion of the image area scanned. As this happens, the aperture correction necessary to compensate will also progressively change. The changing correction can be provided by appropriately changing the settings of the attenuators 68,74. In this case, the pre-programming system 82 could be connected to the zoom control and operated to adjust these circuit settings automatically as zooming takes place.

The four delay circuits 56, 58, 60, 62 preferably each provide the same delay. A typical delay suitable for use in horizontal aperture correction is 75 ns, and for vertical correction is 1 TV line period (64 s).

The whole of the circuit 50 can be implemented in digital or analogue form.

FIG. 6 shows alternative apparatus for providing effects, including soft focus, in a flying spot telecine. FIG. 6 shows only the illuminating CRT and associated circuitry. A standard arrangement can be used to detect and encode an image illuminated by the CRT.

The CRT 100 has a screen 102. During use of the telecine, an electron beam is generated by the CRT and controlled by deflection coils 104 to scan across the screen 102, to produce a flying spot. The beam travels further to reach the screen 102 at extreme points on its scan than at intermediate points. This can result in spot size changes during the scan, and focus coils 106 are provided to overcome this problem by providing fields which reduce the width of the beam when it is illuminating extreme points in the scan.

Current to the focus coil 106 is provided by a current generator 108 in accordance with signals from a circuit 110. The circuit 110 receives signals from the circuit 112 which generate currents for the deflection coils 104. The circuit 110 determines the current position of the spot and communicates this to the generator 108, which generates an appropriate current waveform to maintain a constant spot size.

To this extent, FIG. 6 shows a standard flying spot telecine. However, the telecine of FIG. 6 has additional circuitry 114, 116. Circuit 114 is an interface circuit between a pre-programming system 116 and the generator 108. The interface circuit 114 supplies instructions to the generator 108 which modify its operation. The modified operation causes the generator actively to increase the spot size across all or a portion of its scan so as to produce a de-focussed or soft focus effect in the telecine output. The interface instructs a spot size increase at preselected positions stored in the pre-programming system 116. The pre-programming system can be the same system, or the same type of system as the system 82 in FIG. 5. The system 116 receives inputs 118, 120, 122 corresponding to the inputs 84, 86 and 88 of FIG. 5, so that soft focus effects can be selected for a whole scene of film, for a whole frame or for only a portion of a frame.

In normal operation, without interference from the interface 114, the generator 108 derives its output current according to the current waveforms applied to the deflection coils 104. The interface can be used to modify the operations of the generator 108 or to instruct a particular output current or current waveform for selected image areas or positions.

The astigmatism coils normally provided in a CRT could also be used in a similar manner to achieve programmable soft focus effects.

FIGS. 7 to 9 indicate a further possibility for generating programmable special effects, especially in a flying spot telecine like that of FIG. 6.

In a flying spot telecine used for scanning a statinery image, for instance a slide, the spot is normally scanned on the screen through a raster which matches the desired television raster. This can not be done simply by applying high and low frequency, regular sawtooth waveforms to the horizontal and vertical deflection coils (104 in FIG. 6), because the variation in distance from the electron beam source to the screen would give rise to the raster 124 shown in FIG. 7(a). This distortion from a rectangular raster is known as pincushon-distortion. Compensation is provided by generating magnetic fields in the region of the electron beam, normally by positioning fixed magnets or magnetic coils around the screen. FIG. 7(b) shows how eight sources 126 of magnetic field can compensate for pincushion distortion. Each source produces a field in the direction indicated by an arrow. It is known that the positions of the sources and the strengths and directions of the fields they produce can be chosen to produce a rectangular raster 124 as shown.

This invention provides that, in a telecine in which pincushion correction fields are generated by variable means, such as magnetic coils, means are provided which can operate to cause pincushion distortion to be over-corrected, so that the raster 124 has the barrel shape shown in FIG. 7(c). The result of scanning an image with the raster of FIG. 7(c), to produce a rectangular television image, is to give the viewer the subjective impression of looking at a distorted image on a spherical surface. This technique can, therefore, be used for artistic effect.

Magnetic coils can also be used to undercompensate for pincushion distortion or to generate fields in the wrong direction to compensate, so that the distorted image appears to be on a concave or on a convex spherical surface.

FIG. 7(a) shows the coils 126 connected to an interface circuit 128 for supplying energising currents. The circuit 128 is controlled by a pre-programmer system 130. The system 130 can be the same system or type of system as the systems 82 and 116, so that the special effect of a distorted raster can be programmed for selected frames.

The normal rectangular geometry of the scanned image portion can be changed in other ways. In a telecine having means for correcting pincushion distortion, to produce a rectangular raster, as shown in FIG. 7(b), the current waveforms to the deflection coils can be changed or modulated to deform the raster. FIG. 8 shows the effect of modulating the line scan deflection current waveform with the vertical (or "frame") scan deflection current waveform. This gives rise to a raster which has a line length which decreases progressively down the raster. The resultant (rectangular) television image has detail which is relatively horizontally compressed at the top as compared with the bottom, so that a square film image would be seen as a trapezium 132 (FIG. 9) on a television screen 134.

This distortion produces a subjective change in the perspective of the image, which can be used as a special effect or as a correction similar to techniques known in still photography as "rising front" techniques. These allow images to be adjusted so that tall buildings appear to tilt backwards for instance, or so that buildings which appear to be tilting are made to appear vertical.

The perspective effect and the distortion effect of FIGS. 7(a), 7(b) and 7(c) could be used together for artistic effect. Apparatus enabling the distortion to be programmed can be provided, for instance by modifying the appratus of FIG. 6 so that the interface circuit 114 also controls the generators 112.

Figure 10:
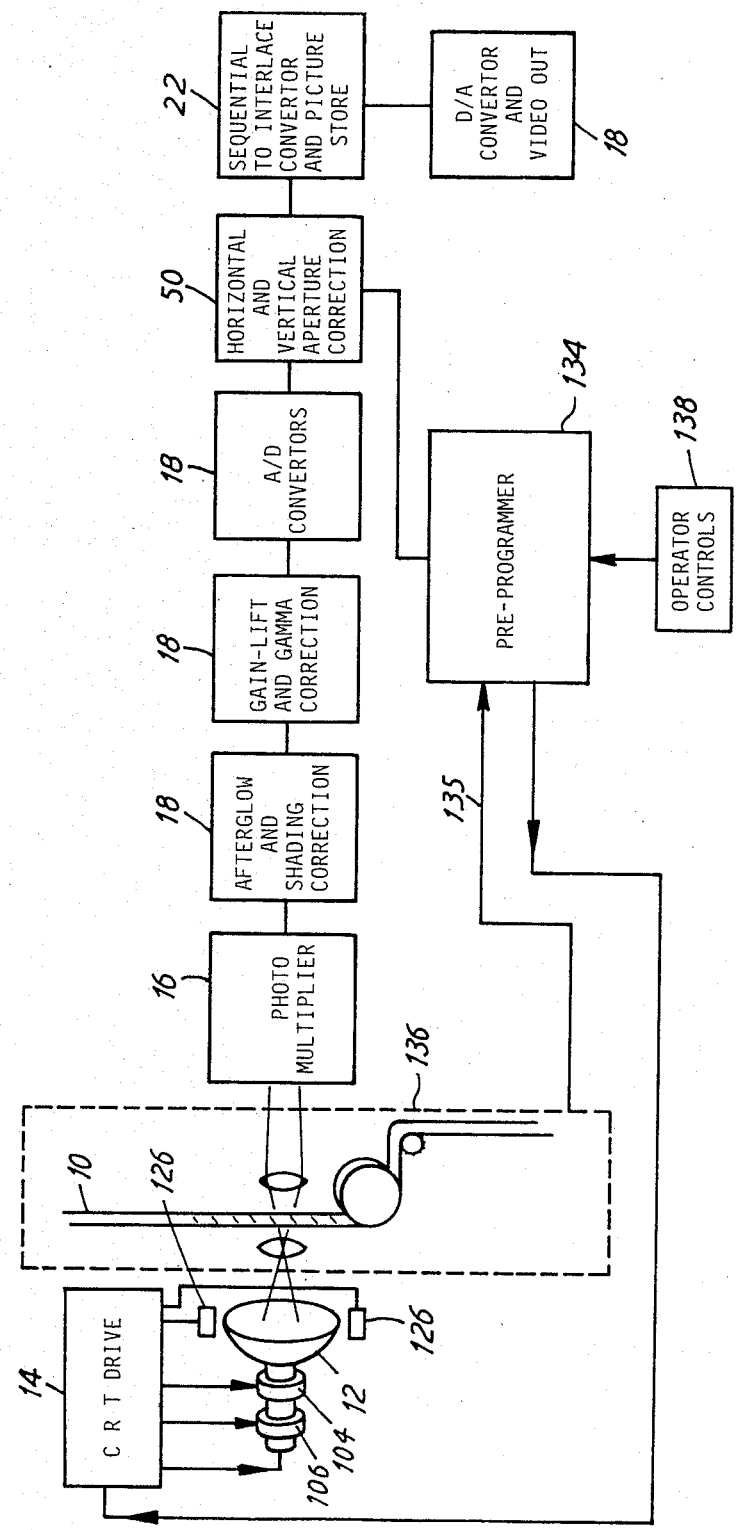
FIG. 10 shows the telecine of FIG. 1 modified for producing various programmable special effects.

FIG. 10 shows, schematically, a flying spot telecine incorporating means for generating all of the effects described above. Many of the elements shown are equivalent to elements shown in FIG. 1, and where this is so, the same numerals are used.

The telecine of FIG. 10 is modified from the telecine of FIG. 1 firstly by the inclusion of a pre-programmer system 134. The system 134 receives synchronising signals over a line 135 from the film transport apparatus 136. These enables the system to record instructions from operator controls 138 for each scene, frame or frame portion of a film 10. After programming, the film can again be run, and the same synchronising signals are provided to the system 134, which then controls the drive circuitry for the CRT and aperture correction circuitry 50. The system 134 sends instructions through interface circuits incorporated in FIG. 10 in the block 134.

The circuitry 50 comprises two circuits of the type described with reference to FIG. 5, for providing vertical and horizontal correction respectively. Each circuit provides high and low frequency treatment signals which are used in proportions set by the system 134.

The system 134 controls the CRT drive circuitry 14 to cause local enlargement of the flying spot on the CRT screen, to produce soft focus effects when required.

The deflection waveforms controlling the position of the flying spot can be controlled by the system 134 to cause a non-rectangular portion of film frames to be scanned, so as to produce distortion effects as described above.

Finally, the system 134 can control the current supplied to coils 126 so that the degree of pincushion distortion correction can be set to produce other distortion effects described above.

Figure 11:
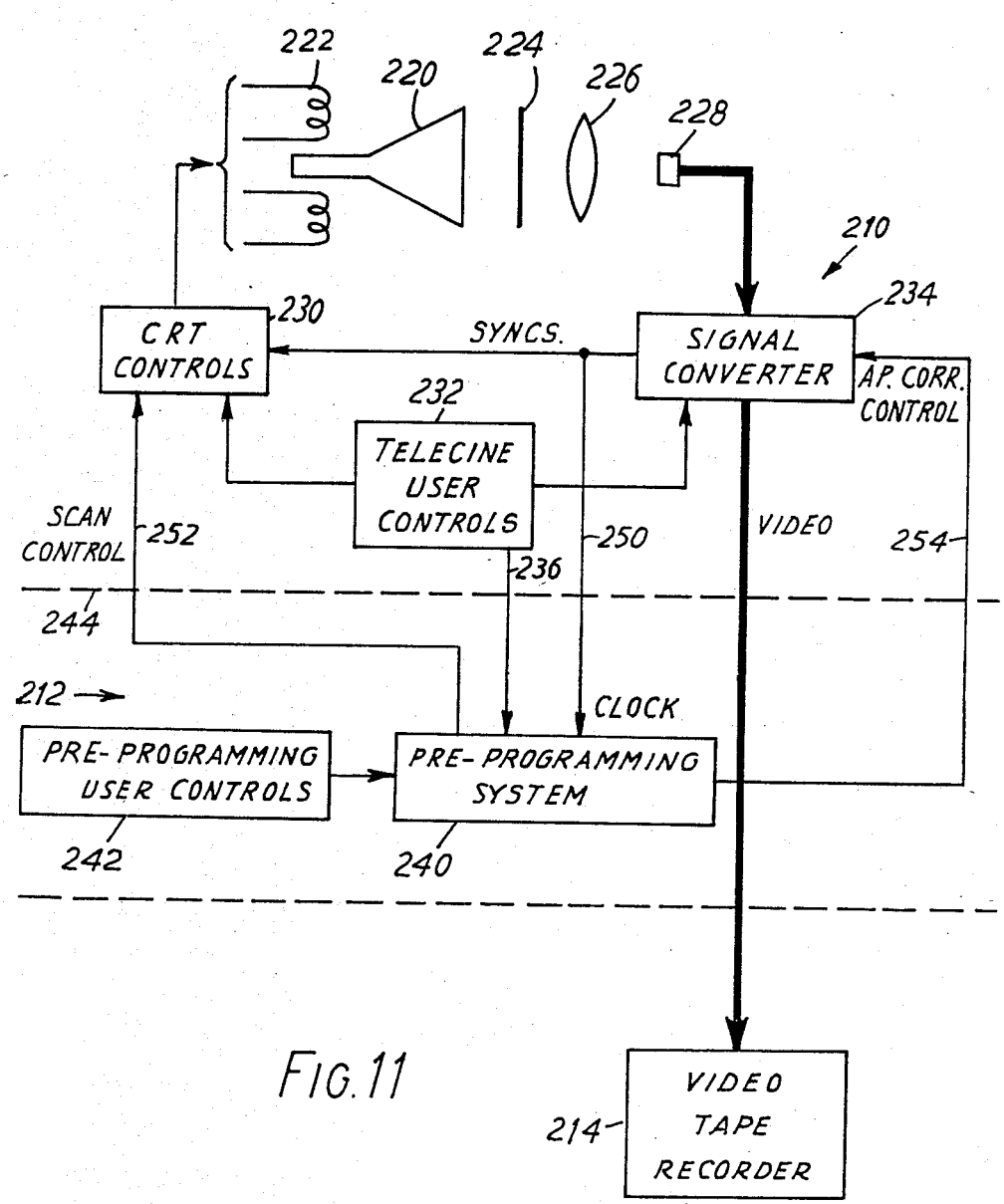
FIG. 11 is a block schematic diagram of a telecine incorporating a pre-programming system.

FIG. 11 is a block schematic diagram of a flying spot telecine adapted as described in the U.S. patent application referred to above, to provide special effects, by the inclusion of a pre-programming system suitable for use in the present invention. The telecine shown in FIG. 11 is a slide scanner, in which a film frame is held stationery while it is scanned. Consequently, the raster shape on the CRT screen is the same as the shape of the scanned image portion. However, those skilled in the art will readily appreciate from the following description how the pre-programming system can be applied to other types of telecine.

The following description of the telecine and its operation relates to the simulation of zoom effects, but other effects, including the effects described above, can also be programmed.

The apparatus illustrated broadly comprises a flying-spot telecine unit 210, a pre-programming unit 212, and a video tape recorder 214, the latter simply being illustrative of a suitable output device.

The flying spot telecine unit comprises a CRT 220 with its scanning coils 222, etc., a film position 224, a condenser lens 226, and a light-sensitive detector 228. All these are shown very diagrammatically for illustrative purposes only. The CRT 220 is controlled by CRT control circuitry 230 which is under the control of remote user controls 232. These controls are also coupled to signal converter circuitry 234 connected to receive the raw video output of detector of detector 228 and to produce an N.T.S.C. encoded output signal which is passed to the video tape recorder 214. Signal converter circuitry 234 corresponds to the circuits 16, 18, 22, 50 of FIG. 10. Video synchronising information is paased from the signal converter 234 to the CRT control circuitry 230 to synchronise the CRT scan. The signal converter circuitry 234 includes in particular circuitry for converting the sequential signal received from the detector 228 to an interlaced signal in which two interlaced fields make one video picture, and also includes aperture correction circuitry. The pre-programming unit 212 is based on a system sold by Rank Cintel Limited of Ware, Hertfordshire, England under the trade mark AMIGO. This pre-programming system is designed for use in recording a feature film on videotape for subsequent broadcasting, and is basicaly intended for use with flying-spot telecines. The colours on feature films, particularly older ones, are not particularly accurate, and it is therefore desirable to adjust the colour rendering to give a subjectively satisfactory appearance when viewed on a television monitor. The AMIGO pre-programming system thus allows an operator to correct the colours and to store the necessary corrections so that they are applied at the required points in the running of the film. To locate the correct point in counts film frames as the film runs through the telecine. The system is also capable of interfacing with the telecine user controls so that for example with a cinemascope film the desired pre-programmed portion of the image is selected for transmission. This information is recorded in the system in relation to specific film frames by counting cine film frames from the beginning of the film.

The unit 212 comprises a pre-programming system 240 with associated user controls 242. The pre-programming system 240 receives over line 236 certain "servo" control information indicating the mode of operation of the telecine, e.g. run forward, run reverse, inch forward, inch reverse and stop.

Various control signals pass across the telecine/pre-programmer interface 244. These include the following:
 (a) line 250 which carries video synchronising information from the signal converter 234 to the pre-programming system 240 for use as a time clock input;
 (b) line 252 which carries scan control information from the pre-programming system 240 to the CRT control circuitry 230 to alter or indeed define the scanning raster provided by the scanning coils 222 on the CRT 220; and
 (c) line 254 which carries aperture correction control signals from the pre-programming system 240 to the aperture corrector in the signal converter circuitry 234 to alter the aperture correction in dependence upon zoom.

Other effects including those described above in relation to FIGS. 1 to 10 can be made available by providing additional control lines from the system 240 and by appropriately extending the storage capacity of the system 240.

For ease of explanation FIG. 1 is a very simplified version of the circuitry used in practice, for instance there will normally be three or more different detectors 228 for the different colour components of the signal, whereas only one is shown. It does however serve adequately to illustrate salient principles of the apparatus to those skilled in the art, to whom the detailed implementation will be apparent.

In operation of the apparatus of FIG. 11, an operator may desire to use a still image on a single frame of film and to simulate a zoom down from the full image displayed to only part of the image being displayed. To achieve this they load the pre-programming system via the user controls 242 with certain items of information as follows:
 (i) the part of the image to be displayed at the beginning of the effects operation;
 (ii) the part of the image to be displayed at the end of the effects operation; and
 (iii) the duration (in hours, minutes, seconds and video frames) of the effects operation between the beginning and end conditions, or alternatively an indication that the change is to be instantaneous.

The parts of the image referred to a (i) and (ii) can conveniently be defined in many ways, but one example is to define two diametrically-opposed corners of the desired part as percentages in relation to the full width and height of the film frame measured from the bottom left hand corner. Thus for a zoom from the full film frame down to the central quarter (in area) the initial condition is defined by co-ordinates 0,0; 100,100 and the final condition by co-ordinates 25,25; 75,75. Another way is to define the center point of the desired part and its size, in which case the information can be encoded as 50,50; 100 and 50,50; 50 in the above example.

Then in use of the apparatus, the pre-programming system 240 operates as follows. It initially instructs the CRT control circuitry over line 252 to form a raster of the size defined by the initial condition (i). It also appropriately instructs the aperture corrector in circuitry 234 over line 254 as described below. As the scan commences, the pre-programming system 240 receives synchronisation information from the signal convertor 234 and in particular receives video picture or field sync. pulses. These pulses are applied over line 250 to the pre-programming system 240 as a timing input.

The pre-programming system performs a linear or profiled interpolation between the input and output conditions (i) and (ii) in dependence upon elapsed time measured in picture periods in relation to the total time of the special effect operation as defined at (iii) above. This operation is defined by the user in hours, minutes, seconds and frames and is converted by the pre-programming system to a corresponding number of picture periods. The use of the video signal sync. pulses as a timing clock in this way in the pre-programming system differs from the normal operation of the system 240 which works strictly in relation to cine film frames.

However, the use of such timing pulses enables the appratus to provide effects analogous to those of digital special effects generator with a still picture.

In parallel with control of the CRT scanning raster, the pre-programming system also alters the aperture correction provided by the aperture corrector in the signal converter circuitry 234. Selection of appropriate aperture correction functions is known generally for use in video signal processing, and the aperture corrector can store a number of predetermined functions for selective use, and possibly for appropriate interpolation between them, in accordance with the signal received over line 254. The effective size of the basix pixels changes (or sharpens) as the overall image size changes, thus avoiding significant reduction of resolution as can occur with a digital special effects simulator.

Alternatively, the aperture correction circuit can be the circuit of FIG. 5, in which case the line 254 will carry information for selecting the proportions of high and low frequency correction to be used.

While the detailed implementation of such a system as described above is believed to be within the competence of the skilled man in the art, some further details of the applicant's preferred method will now be given with reference to the remaining figures of the drawings.

Figure 12:
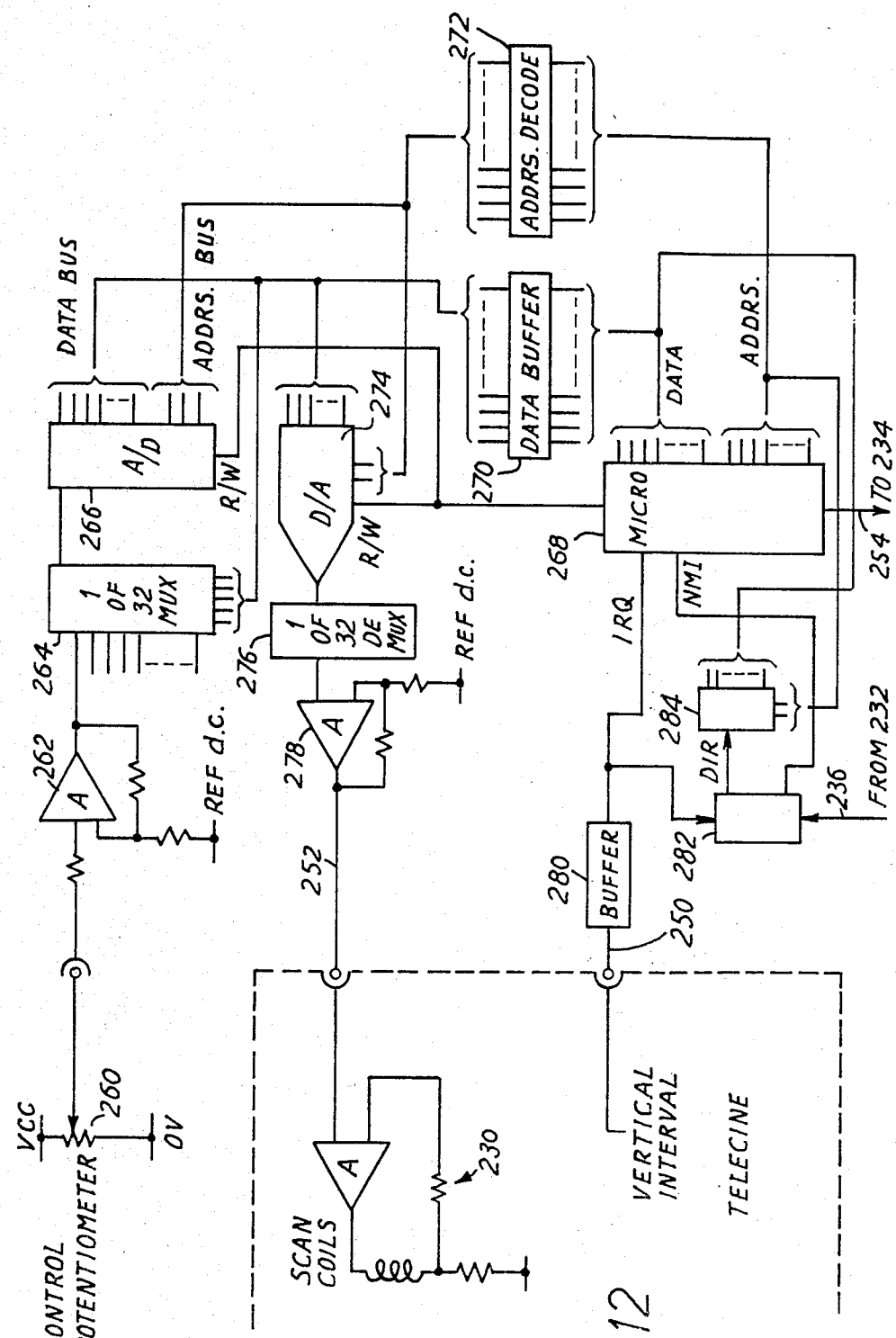
FIG. 12 is a schematic circuit diagram of one channel in the pre-programming system of the apparatus of FIG. 11.

FIG. 12 is a block schematic diagram of one analogue control signal channel in the pre-programming system 240 in FIG. 11. There are typically 232 such channels to enable different effects to be stored for selective use.

FIG. 12 shows a control potentiometer 260 coupled to an input amplifier 262 and hence to a 1 out of 32 selector 264. The output of selector 264 is converted to a digital output in an analogue to digital converter (A/D) 266 which provides data bits indicating the value represented on potentiometer 260 and address bits representing that digital channel.

A processing unit comprises a microprocessor 268 (such as a type No. MC68B09E produced by Motorola) with data buffer 270 and address decoder 272 which receive the data and address bits respectively and operates in accordance with stored programs as more fully illustrated in FIGS. 13 to 15 and described below. The microprocessor output controls a digital to analogue converter (D/A) 274 which applies through a multiplexer 276 and amplifier 278 control signals to the scanning control circuits in circuitry 230, diagrammatically shown. The microprocessor also supplies digital signals over line 254 to the aperture corrector in circuitry 234.

Timing information for the microprocessor 268 is received from the telecine. Vertical interval pulses are received in a buffer 280 which define the timing of the vertical field blanking interval in the video signal which is the time during which the system must recalculate the scanning parameters for the next picture. Interface circuit 282 provides directional information to processor 268 via interface circuit 284 to enable an "up" count or "down" count, and is coupled to the user controls 232 in FIG. 1 by line 236.

The output of buffer 280 is applied to an interrupt request input IRQ on the microprocessor 268 and the output of buffer 282 is applied to a non-maskable interrupt NMI on the microprocessor.

The operation of the system will be described with reference to the flow charts of FIGS. 13 to 15. Referring first to FIG. 13, on initialisation 300, the programme jumps to the "hardware initialisation" sequence 302 which configures all the user controls and telecine element required to operate the pre-programmer. This completed, the programme jumps to the main sequencer comprising 304, 306, 308 and 312. This program loop scans and updates memory within the pre-programmer as well as acknowledge command calls by the user 310.

Tests are implemented as to whether or not the system (pre-programmer) is required to output stored data 312 and if so whether a "time coincidence" has occurred. That is to say that a previously stored time is equal to the count sequence currently active 314. If so, then memory workspace is refreshed with new data from the next sequence or event stored 316. This new data will have been previously entered by the user at a required count by an "Enter Data" command.

On completion of the output of new data, a test is implemented so as to determine whether the subsequent event is a "dynamic" 318. A "dynamic" is an event which signals the processor 268, FIG. 12, to compute the necessary steps required to move the telecine analogue control over the required period of time 320. Having done this the processor programme jumps to the main loop to repeat the sequences described under the disclosed conditions.

Figure 13:
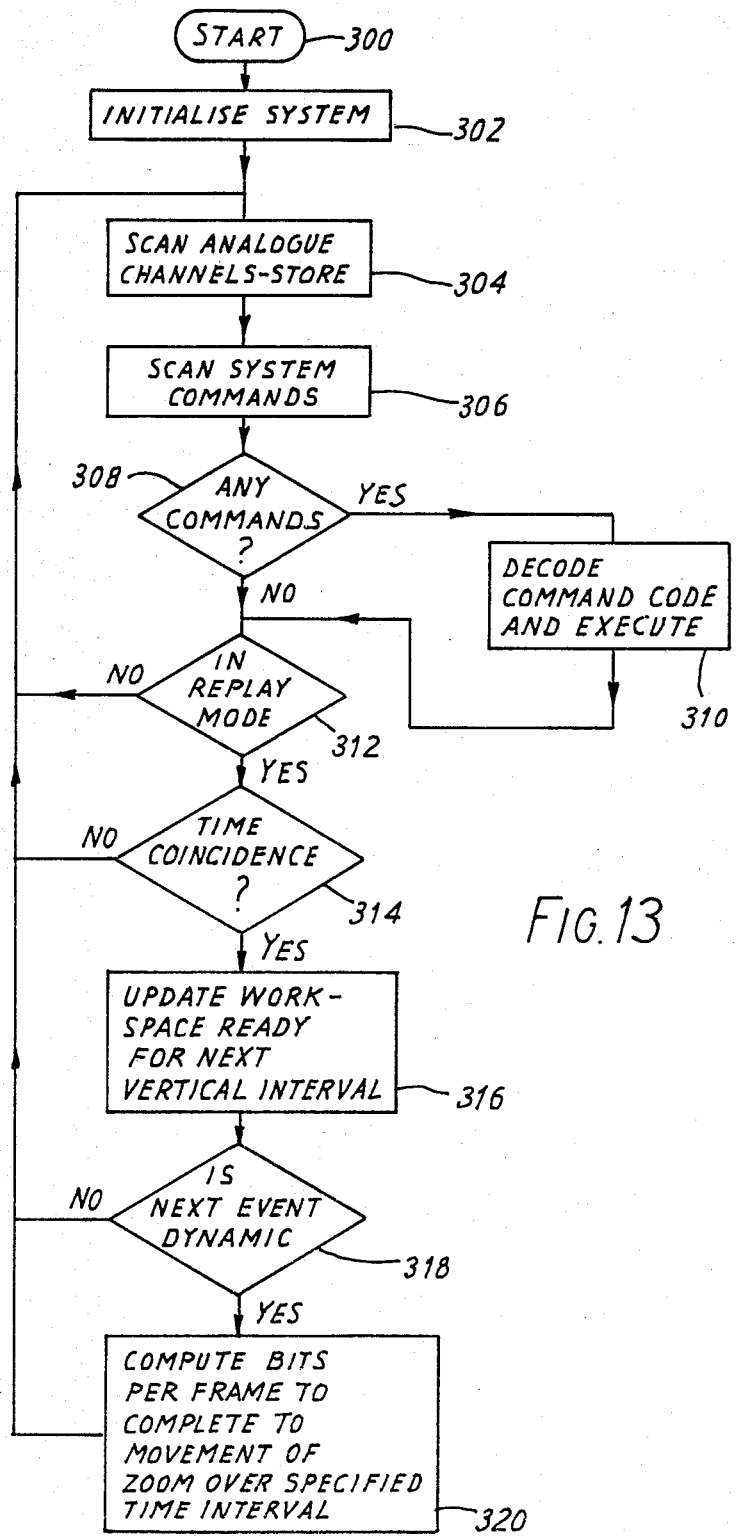
FIG. 13 is a flow chart illustrating the main operation sequence of the microprocessor in FIG. 12.
Figure 14:
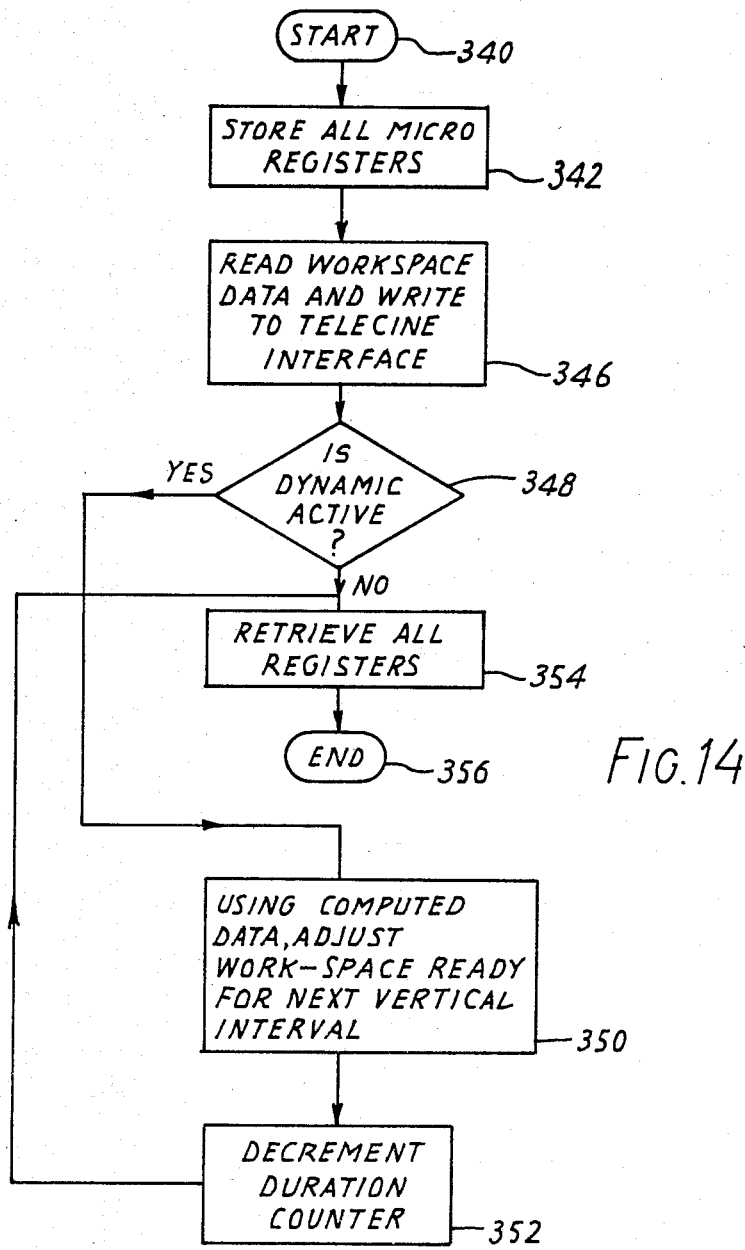
FIG. 14 is a flow chart illustrating the microprocessor operation in response to a first interrupt IRQ indicating the presence of a vertical interval in the video signal.

As shown in FIG. 14, the main loop described in FIG. 13 may be interrupted at any time by the vertical interval, IRQ, so as to cause the refresh of all telecine parameters controlled by the pre-programmer (FIG. 12, elements 280, 282 and 268). This starts at 340 and proceeds to 342 to hold all current register data. On completion, the programme jumps to the output routine when data previously placed in workspace is written to the output hardware 346. Following this, a "dynamic" check, or test, is carried out such that if a "dynamic" is active the compute steps are added or subtracted from the workspace data ready for the next vertical interval 348, 350 and 352. This done, if necessary, the processor recovers all register data and links back to the point from which it was interrupted 354 and 356.

Figure 15:
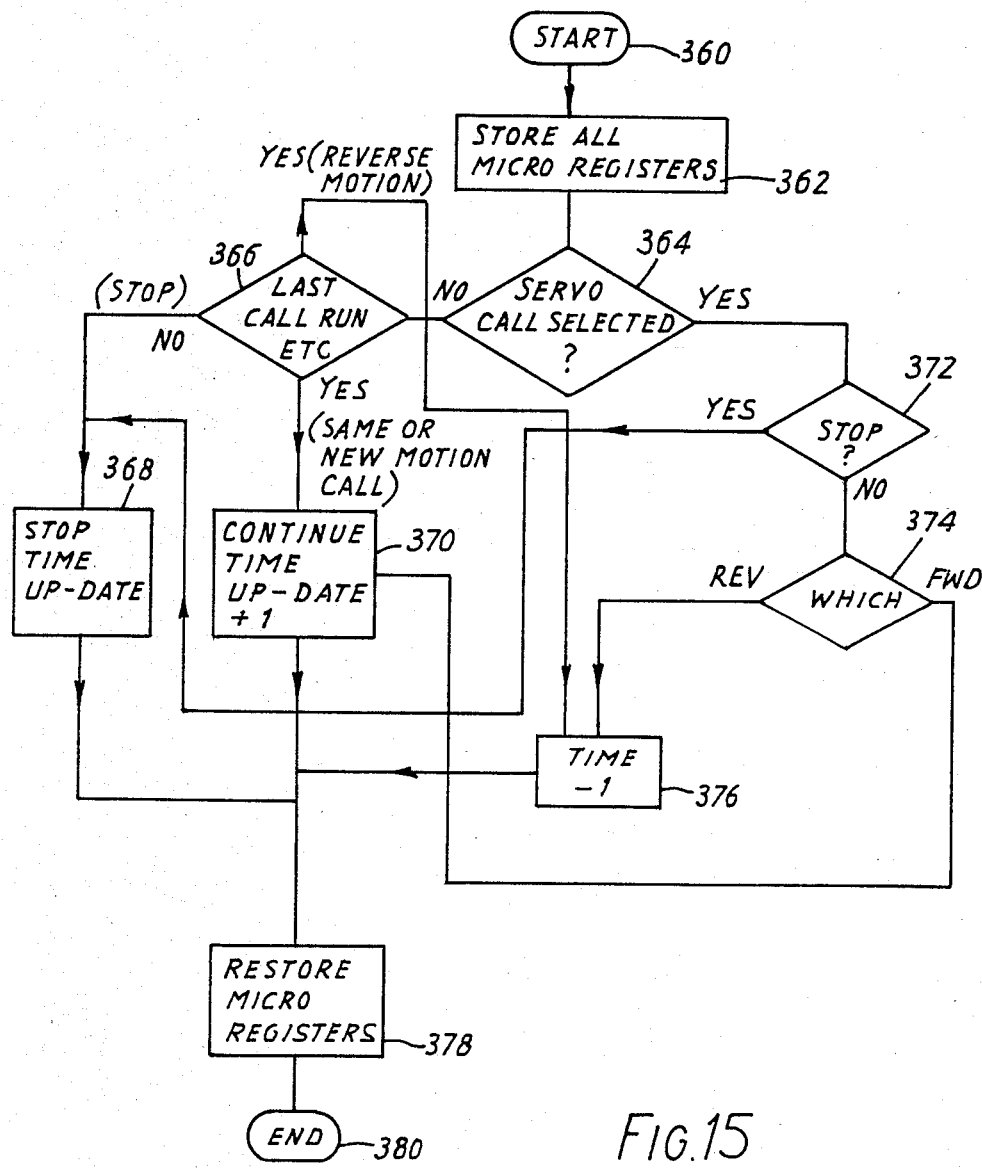
FIG. 15 is a flow chart illustrating the microprocessor operation in response to a second interrupt NMI indicating the reception of a vertical interval count pulse.

The flow-chart of FIG. 15 is the NMI (Non Maskable Interrupt) sequence which under servo control (run forward, run reverse, inch forward, inch reverse and stop) determines the direction of the count sequence as well as the rate.

On receipt of this NMI signal 360 the processor 268, FIG. 12, stores away all current register data 362 and interrogates the servo status 364. If a "stop" is or has been selected, then all count control and update is halted immediately 372 and the programme exits via 378 and 380 restoring all register data, thus returning to the point from which it was interrupted.

Step 366 determines if no servo call was made or what the last call command was. If run forward then an increment of the time code is required 370. On completion the programme exits via steps 378 and 380. Inch forward is tested by step 366 and an increment to the time code (count) is carried out every six vertical intervals. Run and inch reverse also are tested by step 366 and jump to 376 for a decrement of count data again whose exit is via 378 and 380.

It should be noted, referring to FIG. 12, that analogue data for step 304 is read using elements 262, 264, 270 and 272; that output data is obtained from elements 274, 276, 270 and 272; and that the NMI control and servo controls comprise elements 280, 282, 284 and 268 on FIG. 12 and 230, 240 and 242 on FIG. 11.

It will be appreciated that many modifications may be made to the examples described above within the scope and spirit of the claims below.

What we claim is:

1. A method of providing aperture correction for a video signal, comprising the steps of sampling said video signal in its uncorrected form at a first and a second sample point temporally ahead of a reference point in said signal, sampling said video signal in its uncorrected form at corresponding first and second sample points temporally behind said reference point, combining said first samples to form a first treatment signal, combining said second samples to form a second treatment signal, and combining said treatment signals in selectable proportions with said video signal at said reference point, and further comprising the steps of preselecting said selectable proportions for each scene, frame or frame portion of a length of film to be processed by a telecine, recording said presented proportions in a pre-programming means, supplying said pre-programming means with synchronising signals while said video signal is being processed, to cause said pre-programming means to provide control signals specifying said preselected proportions corresponding to the scene, frame or frame portion being processed, and using said control signals to determine the proportion of each treatment signal which is combined with said video signal.

2. The method of claim 1, wherein said sample points corresponding to each treatment signal are symmetrically positioned in time about said reference point.

3. The method of claim 2, wherein one pair of said sample points are separated from said reference point by a separation time which is twice the separation time of the other pair of said sample points.

4. The method of claim 3, wherein the shorter of the said separation times is approximately 75 ns.

5. The method of claim 3, wherein said video signals are line sequential and the shorter of the said separation times is equal to the line time.

6. The method of claim 1, including the steps of coring said treatment signals before combining them with said video signal.

7. The method of claim 6, wherein coring is applied to a degree which is selectable.

8. The method of claim 7, wherein said degree of coring is preselected and stored in said pre-programming means, and said control signals including signals specifying said preselected degree.

9. The method of claim 1, wherein said treatment signals are combined with said video signal in a selectable sense with respect to the sense of said video signal.

10. The method of claim 9, in which signals are prerecorded in said pre-programming means to indicate the required sense of the combination, said pre-programming means supplying inversion control signals in response to said synchronising signals, and said treatment signals being combined with said video signal in a sense determined by said inversion control signals.

11. An aperture correction circuit comprising:
   (a) a signal input for receiving a video signal from a telecine apparatus, and a signal output for providing a treated video signal;
   (b) means operable to provide samples of an unmodified input at first, second, third, fourth and fifth sample points in time;
   (c) first combining means for combining said samples provided at said first and fifth sample points to generate a first treatment signal;
   (d) second combining means for combining said samples provided at said second and fourth sample points to generate a second treatment signal;
   (e) third combining means for combining said first and second treatment signals in selectable proportions with said sample provided at said third sample point, to generate said corrected video signal;
   (f) pre-programming means, said pre-programming means being operable to record proportions for use by said third combining means, said proportions being preselected for each scene, frame or frame portion of a length of film to be processed by said telecine;
   (g) synchronising means operable to supply synchronising signals to said pre-programming means indicating said scene, frame or frame portion being processed;
   said pre-programming means being operable in response to said synchronising signals to provide control signals to said third combining means, said control signals specifying said preselected proportions corresponding to said scene, frame or frame portion being processed.

12. The circuit of claim 11, wherein said sample providing means comprises first, second, third and fourth delay circuits each having an input and an output and being operable to delay a signal received at said input and to provide said signal at said input after delay, said delay circuits being connected together in series, said input of said first delay being said signal input and said samples being provided at said delay circuit inputs and at said output of said fourth delay circuit.

13. The circuit of claim 11, wherein said third combining means comprises first and second controllable, variable attenuator means for attenuating said first and second treatment signals respectively, before said corrected video signal is generated.

14. The circuit of claim 11, wherein said third combining means comprises coring means operable to apply a coring function to said treatment signals.

15. The circuit of claim 14, wherein said coring means is controllable to apply said coring function to a selectable degree.

16. The circuit of claim 15, wherein said pre-programming means is operable to provide control signals including coring signals specifying a degree of coring which has been preselected for the scene, frame or frame portion being processed and has been recorded in said pre-programming means.

17. The circuit of claim 11, further comprising inverter means selectively actuable to invert said treatment signals with respect to said sample provided at said third sample point.

18. The circuit of claim 17, wherein said inverter means is controlled to invert or not to invert in accordance with inversion control signals provided by said pre-programming means in accordance with prerecorded signals.

19. The circuit of claim 12, wherein each delay circuit provides the same length of delay.

20. The circuit of claim 19, wherein said video signal is in line sequential form and said length is one line time.

21. The circuit of claim 20, wherein said length is substantially 75 ns.

22. A method of operating a flying spot telecine to produce a video signal representing an image on a transparent film portion, the method including supplying a focus waveform to increase the size of the spot during at least part of its scan, and thereby defocusing at least a portion of said image.

23. The method of claim 22, including deriving said focus waveform in accordance with pre-programmed data.

24. The method of claim 23, including loading pre-programming means with said pre-programmed data relating to at least one image portion, supplying synchronising signals to said pre-programming means during operation of said telecine, to cause said pre-programming means to reproduce said preprogrammed data corresponding to the image portion being processed, and selectively increasing said spot size in accordance with said pre-programmed date.

25. The method of claim 24, wherein said synchronising signals identify the portion of said image being processed, said data being different for different image portions.

26. A flying spot telecine comprising:
 (a) a cathode ray tube operable to produce a scanning electron beam;
 (b) focussing means for controlling the size of said spot produced by said beam;
 (c) defocussing means operable to cause said focussing means to increase said spot size at selectable positions of said spot.

27. The telecine according to claim 26, wherein said defocussing means comprises pre-programming means for storing and reproducing data representing said selectable positions, whereby said positions may be programmed.

28. The telecine of claim 27, wherein said positions may be programmed for a plurality of film frames or scenes, said telecine further comprising identifying means for supplying signals identifying the film frame or scene being processed and said preprogramming means being responsive to said identifying signals to reproduce stored data corresponding to said identified frame or scene.

29. The telecine of claim 28, wherein said pre-programming means further supplies data identifying a preselected degree of defocussing required.

30. A method of generating a video signal representative of an image on a transparent film portion by scanning said film portion in a raster-scanning telecine, wherein said raster of said telecine scans a non-rectangular area of said image to cause said video signal to represent said image in a distorted form.

31. The method of claim 30, wherein the shape of said raster is variable to vary the shape of said non-rectangular area.

32. The method of claim 31, wherein said shapes are controlled in accordance with pre-programmed shape selections.

33. The method of claim 32, wherein said shape selections are pre-programmed for a plurality of film portions to be scanned.

34. The method of claim 33, including the steps of storing said pre-programmed selections in pre-programming, supplying to said pre-programming means synchronising signals indicating the film portion to be scanned, to cause said pre-programming means to reproduce the corresponding pre-programmed selection, and controlling the shape of said raster in accordance with said reproduced selection.

35. The method of claim 30, applied to a telecine in which the scanning of said raster is controlled by a horizontal scanning signal and a vertical scanning signal, in which one or both of the scanning signals are modulated by a modulating signal to distort said raster.

36. The method of claim 35, in which said modulating signal is said vertical scanning signal and said modulated signal modulates said horizontal scanning signal.

37. The method of claim 30 applied to a flying spot telecine having a cathode ray tube for producing a flying spot which scans a raster, including the steps of generating in the region of said cathode ray a magnetic field to distort said raster to cause said raster to scan a non-rectangular image area.

38. The method of claim 37, in which said magnetic field causes pin-cushion or barrel distortion in said raster.

39. The method of claim 37, in which a plurality of energisable magnetic coils are provided for generating said magnetic field, said coils being energised by currents which are controlled to cause said raster distortion.

40. A telecine for generating a video signal representative of an image on a transparent film portion, comprising scanning means for scanning said image with a scanning raster, said scanning means comprising distortion means which distort said scanning raster to cause a non-rectangular image portion to be scanned.

41. The telecine of claim 40, wherein said distortion means is operable to distort said raster to a degree which is variable.

42. The telecine of claim 41, comprising control means for controlling said distortion means to distort said raster in accordance with pre-programmed shape selections.

43. The telecine of claim 42, wherein said control means comprises pre-programming means operable to store and reproduce data representing pre-programmed shape selections for a plurality of film portions to be scanned.

44. The telecine of claim 40, wherein said scanning means is operable to generate a horizontal and a vertical scanning signal for controlling said scanning raster, and said distortion means comprises modulation means for modulating one or both of said scanning signals, to distort said scanning raster.

45. The telecine of claim 44, wherein said modulation means modulates said horizontal scanning signal with said vertical scanning signal.

46. The telecine of claim 40, comprising a cathode ray tube for generating a flying spot to scan said raster, and wherein said distortion means comprises field means for generating a magnetic field in the region of the cathode ray.

47. The telecine of claim 46, wherein said field means is operable to generate a magnetic field which causes said scanned image portion to have pin-cushion or barrel distortion.

48. A method of operating a raster-scanning telecine to produce a video signal encoding an image being scanned, including providing aperture correction for said video signal and distorting said raster to scan a non-rectangular image area, said aperture correction being provided by sampling said video signal in unmodified form at two sample points temporally ahead of a reference point and at two sample points temporally behind said reference point, using said samples neighbouring said reference point to form a treatment signal, combining said treatment signal in selectable proportions with a second treatment signal formed from the other said samples, and applying said combined treatment signals to said video signal at said reference point, said proportions being determined by pre-selected proportions stored in pre-programming means.

49. A raster-scanning telecine for scanning a film image to generate a video signal, comprising:
(a) means for sampling said video signal at first, second, third, fourth and fifth sample points in time;
(b) first combining means for combining said first and fifth samples to form a first treatment signal;
(c) second combining means for combining said second and fourth samples to form a second treatment signal;
(d) third combining means for combining said treatment signals in selectable proportions and applying said combined signals to said video signal at said third sample point;
(e) means for distorting said raster to scan a selectable, non-rectangular portion of said image;
(f) pre-programming means, said pre-programming means being operable to record proportions for use by said third combining means, said proportions being preselected for each scene, frame or frame portion of a length of film to be processed by said telecine;
(g) synchronising means operable to supply synchronising signals to said pre-programming means indicating said scene, frame or frame portion being processed;
said pre-programming means being operable in response to said synchronising signals to provide control signals to said third combining means, said control signals specifying said pre-selected proportions corresponding to said scene, frame or frame portion being processed.

50. A method of operating a flying spot telecine to produce a video signal encoding an image being scanned, including providing aperture correction for said video signal and enlarging said spot at selectable positions to deform said encoded image, said aperture correction being provided by sampling said video signal in unmodified form at two sample points temporarily ahead of a reference point and at two points temporarily behind said reference point, using said samples neighbouring said reference point to form a treatment signal, combining said treatment signal in selectable proportions with a second treatment signal formed from the other said samples and applying said combined treatment signals to said video signals at said reference point, said proportions being determined by pre-selected proportions stored in pre-programming means.

51. A flying spot telecine for scanning a film image to generate a video signal, comprising:
(a) means for sampling said video signals at first, second, third, fourth and fifth sample points in time;
(b) first combining means for combining said first and fifth samples to form a first treatment signal;
(c) second combining means for combining said second and fourth samples to form a second treatment signal;
(d) third combining means for combining said treatment signals in selectable proportions and applying said combined signals to said video signal at said third sample point;
(e) means for enlarging said flying spot at selectable positions to defocus said image;
(f) Pre-programming means, said pre-programming means being operable to record proportions for use by said third combining means, said proportions being preselected for each scene, frame or frame portion of a length of film to be processed by said telecine;
(g) synchronising means operable to supply synchronising signals to said pre-programming means indicating said scene, frame or frame portion being processed;
said pre-programming means being operable in response to said synchronising signals to provide control signals to said third combining means, said control signals specifying said pre-selected proportions corresponding to said scene, frame or frame portion being processed.

52. A method of operating a flying spot telecine including distorting the raster scanned by the flying spot to cause said spot to scan a non-rectangular area of an image, and enlarging the spot at selectable positions to defocus said positions of said area of said image.

53. A flying spot telecine comprising:
(a) means for distorting the raster scanned by said flying spot to cause said spot to scan a non-rectangular area of an image; and
(b) means for increasing the size of said spot at selectable positions to deform said image at said selectable positions.

54. A method of operating a flying spot telecine to produce a video signal encoding an image to be scanned, including providing aperture correction for said video signals; distorting the raster scanned by said flying spot to cause said spot to scan a non-rectangular area of said image, and enlarging said spot at selectable positions to defocus said encoded image, said aperture correction being provided by sampling said video signal in unmodified form at two sample points temporarily ahead of a reference point and at two points temporarily behind said reference point, using said samples neighbouring said reference point to form a treatment signal, combining said treatment signal in selectable proportions with a second treatment signal formed from the other said samples and applying said combined treatment signals to said video signal at said reference point, said proportions being determined, by pre-selected proportions stored in pre-programming means.

55. A method of operating a telecine with aperture correction circuitry, including the steps of:
(i) selecting proportions of high and low frequency aperture correction to be applied to each region of an image to be processed by said telecine;
(ii) recording said proportion selections in pre-programming means;
(iii) operating said pre-programming means while scanning said image, to reproduce said pre-programmed proportion selections; and
(iv) operating said aperture correction circuitry to provide high and low frequency aperture correction in accordance with said pre-programmed proportion selections.

56. A method of operating a flying spot telecine, including:
(i) selecting spot sizes for use when scanning each region of an image to be processed by said telecine; at least some of said spot size selections representing spot size increases generating a soft focus effect;
(ii) recording said spot size selections in pre-programming means;

(iii) operating said pre-programming means while scanning said image, to reproduce said pre-programmed spot size selections; and (iv) controlling said spot size in accordance with said pre-programmed spot size selections reproduced by said pre-programming means, including increasing said spot size to generate a soft focus effect.

57. A method of operating a raster-scanning telecine to generate a video signal representing scanned images, including:

(i) selecting an area of image to be scanned for each image to be processed by said telecine, at least some of said selected areas being non-rectangular, to cause corresponding images to be represented in distorted fashion be said video signal;

(ii) recording said image area selections in pre-programming means;

(iii) operating said pre-programming means while scanning said images, to produce said pre-programmed image area selections; and (iv) controlling said telecine to scan a raster selected in accordance with said pre-programmed image area selections to cause said selected image areas to be scanned by said raster.

* * * * *